US010865835B1

United States Patent
Ciotola

(10) Patent No.: US 10,865,835 B1
(45) Date of Patent: Dec. 15, 2020

(54) SHAFT COUPLING ALIGNMENT DEVICE

(71) Applicant: Alfredo A. Ciotola, Warren, NJ (US)

(72) Inventor: Alfredo A. Ciotola, Warren, NJ (US)

(*) Notice: Subject to any disclaimer, the term of this patent is extended or adjusted under 35 U.S.C. 154(b) by 0 days.

(21) Appl. No.: 16/684,063

(22) Filed: Nov. 14, 2019

(51) Int. Cl.
| | |
|---|---|
| *F16D 3/70* | (2006.01) |
| *F16D 3/78* | (2006.01) |
| F16D 3/68 | (2006.01) |
| F16D 65/02 | (2006.01) |
| F16D 3/60 | (2006.01) |
| F16D 3/76 | (2006.01) |
| F16D 3/48 | (2006.01) |

(52) U.S. Cl.
CPC ............... *F16D 3/70* (2013.01); *F16D 3/78* (2013.01); *F16D 3/48* (2013.01); *F16D 3/60* (2013.01); *F16D 3/68* (2013.01); *F16D 3/76* (2013.01); *F16D 2065/1396* (2013.01)

(58) Field of Classification Search
CPC ..... F16D 3/07; F16D 3/78; F16D 3/60; F16D 3/76; F16D 2065/1396; F16D 3/68; F16D 3/48
USPC ....................................... 464/70–72; 267/152
See application file for complete search history.

(56) References Cited

U.S. PATENT DOCUMENTS

| | | | |
|---|---|---|---|
| 268,807 A | 12/1882 | Landis | |
| 1,188,113 A | 6/1916 | Thomas | |
| 1,204,925 A * | 11/1916 | Aldrich | F16D 3/70 464/71 |
| 1,343,413 A | 6/1920 | Smith et al. | |
| 1,365,957 A | 1/1921 | Smith | |
| 1,402,688 A | 1/1922 | Travis | |
| 1,482,097 A | 1/1924 | Smith | |
| 1,814,836 A | 7/1931 | Lederman | |
| 1,862,355 A | 6/1932 | Anderson | |
| 2,181,888 A | 12/1939 | Gustin | |
| 2,453,012 A | 11/1948 | Hickman | |
| 2,930,211 A | 3/1960 | Guy | |
| 3,304,743 A | 2/1967 | Paulsen | |
| 3,422,637 A | 1/1969 | Kelley | |
| 3,724,239 A | 4/1973 | Calistrat | |
| 4,482,136 A * | 11/1984 | Wolf | F16L 3/20 267/152 |
| 4,591,350 A | 5/1986 | Oberneier | |
| 5,160,122 A * | 11/1992 | Balsells | F16F 1/045 |
| 5,259,511 A * | 11/1993 | Pierson | B07B 13/16 |
| 5,676,613 A | 10/1997 | Valcourt et al. | |
| 6,325,722 B1 | 12/2001 | Ciotola | |

* cited by examiner

Primary Examiner — Greg Binda
(74) Attorney, Agent, or Firm — Roberts & Roberts, LLP

(57) ABSTRACT

A coupling for attaching a pair of longitudinally aligned rotatable shafts. It has a pair of circular hubs having a bore through a central axis. A shaft is fixed within each bore. A circular power ring is positioned between the hubs. Either the hubs or the power ring have circular apertures through and spaced around each hub and a hollow bushing positioned in each circular aperture. The other of the hubs or the power ring has mating coupling pins extending outwardly mounted within a corresponding one of the hollow bushings. Preferably an end of the coupling pins mating with the bushings have a generally truncated spherical, bulbous configuration with an outside diameter about 5% to about 25% greater than an outside diameter of its opposite end. Preferably elastically deformable, solid cylindrical spacers are attached to, and projecting between each circular hub and the circular power ring.

23 Claims, 10 Drawing Sheets

SHAFT COUPLING ALIGNMENT DEVICE

BACKGROUND OF THE INVENTION

Field of the Invention

The present invention relates to shaft couplings. More particularly, the invention relates to a coupling with a free-floating center piece for joining rotatable shafts which tolerates shaft misalignment.

Description of the Prior Art

Rotatable shafts are typically used in motor powered mechanical devices such as pumps and the like. These devices cooperate with a motor via a rotatable shaft which, when rotated along a fixed axis, rotates other machine parts. Because these shafts can only reach limited lengths, they are often connected to one another to form a longer, continuous rotatable shaft. Attempts have been made in the art to compensate for misalignment in rotatable shafts, however rotational vibrations in such shafts and couplings eventually result in an angular distortion and misalignment between the shafts. Shaft axes inevitably exert a lateral force which causes bearing to wear out. This leads to improper shaft rotation, unscheduled outages and costly repairs.

Various attempts have been made to compensate for misalignment between rotatable shafts. U.S. Pat. No. 268,807 discloses a coupling for shafts which includes a pair of end units with openings for the shafts and which are held onto the shafts via set screws. The end units have links that connect to a central unit via spherical ends on the links and transmits motion thereby. The pins may be spherical but they do not directly connect the end units with the central disk, rather they are connected via intermediate linkages. U.S. Pat. No. 4,591,350 discloses a compensator coupling which includes an intermediate sleeve with resilient bushings for engaging shaft ends. A shaft presses against a spherical ring, and compression springs are required. U.S. Pat. No. 1,862,355 discloses a flexible coupling which includes a bar that carries spherical engagement pins. A bar is bent at right angles to form ends which carry spherical arrangement pins. U.S. Pat. No. 1,188,113 shows a three disk arrangement where the disks are attached by bolts surrounded by springs. U.S. Pat. No. 2,181,888 shows a three disk arrangement where the disks are indirectly connected via links. U.S. Pat. No. 1,482,097 shows a flexible coupling whose end members are linked by a support disk via straight pins. U.S. Pat. No. 3,304,743 shows a coupling having hubs which are connected via an intermediate plate. Ball connectors are intended to pivot and slide in the bore, and a shaft is required. U.S. Pat. No. 1,365,957 shows a spring coupling. U.S. Pat. No. 1,814,836 shows a shaft coupling with tapered coupling pins. Each of the foregoing designs are ineffective for tolerating shaft misalignment. U.S. Pat. No. 6,325,722 provides a coupling for attaching a pair of longitudinally aligned, rotatable shafts. It has a pair of circular hubs having a bore through a central axis. A shaft is fixed within each bore. A circular power ring is positioned between the hubs. Either the hubs or the power ring have circular apertures through and spaced around each hub and a hollow bushing positioned in each circular aperture. The other of the hubs or the power ring has mating coupling pins extending outwardly mounted within a corresponding one of the hollow bushings.

It would be desirable to provide a free-floating coupling device for joining rotatable shafts which tolerates vibration induced shaft misalignment. The coupling device of the present invention solves this problem. Such a coupling allows for flexibility at the joining point while tolerating misalignment in the rotatable shafts. The present invention improves on prior known couplings by reducing the torsional vibration ("chatter") transmitted across the coupling from the driver to the driven equipment. Residual "chatter" is due to the clearance between the outside diameter of the pin and the inside diameter of the bushing. The clearance between the pin and the bushing also allows abrasive dust normally present in industrial environments to collect in the bushing and accelerate the wear of the pins. Bushings according to the invention use a hard rubber layer on its inside and a softer rubber layer on its outside together with a wavy, perforated cylinder between the interior hard rubber layer and the softer outer layer. In addition, the coupling pins preferably have a generally truncated spherical, bulbous configuration. It is also preferred to employ a plurality of elastically deformable, solid cylindrical spacers attached to, and projecting between each circular hub and the circular power ring.

SUMMARY OF THE INVENTION

The invention provides a coupling for attaching a pair of longitudinally aligned, rotatable shafts comprising:

a) a pair of circular hubs each circular hub having an inner flat surface and an outer surface, each circular hub having a bore through a central axis thereof; an attachment fixing one of the rotatable shafts within each bore; a plurality of circular apertures through and substantially equally spaced around each circular hub; a plurality of hollow bushings positioned such that one hollow bushing is positioned in each circular aperture; said hollow bushings comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder;

b) a circular power ring positioned between the inner flat surface of each circular hub; said circular power ring having front and rear flat surfaces; a plurality of coupling pins, said coupling pins having a first end and a second end, said first end being fixed to and extending outwardly from each of the front and rear surfaces of said circular power ring, and the second end of said coupling pins having a generally truncated spherical, bulbous configuration such that the second end has an outside diameter about 5% to about 25% greater than an outside diameter of the first end; each of said coupling pins being mounted such that the bulbous second end of each coupling pin is positioned for a frictional engagement within a corresponding one of the hollow bushings, and an inside diameter of each of the bushings is at least 0.125 inch larger than an outside diameter each bulbous second end of each coupling pin; and wherein the circular power ring is axially free floating with respect to each circular hub.

The invention further provides a coupling for attaching a pair of longitudinally aligned, rotatable shafts comprising:

a) a pair of circular hubs each circular hub having an inner flat surface and an outer surface, each circular hub having a bore through a central axis thereof; an attachment fixing one of the rotatable shafts within each bore; a plurality of coupling pins, said coupling pins having a first end and a second end, said first end being fixed to and extending outwardly from each of the inner flat surfaces of said circular hubs, and the second end of said coupling pins having a generally truncated spherical, bulbous configuration such that the second end has an outside diameter about 5% to about 25% greater than an outside diameter of the first end;

b) a circular power ring positioned between the inner flat surface of each circular hub; said circular power ring having front and rear flat surfaces; a plurality of circular apertures through and substantially equally spaced around the front and rear flat surfaces of the power ring; a plurality of hollow bushings positioned such that one hollow bushing is positioned in each circular aperture; said hollow bushings comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder; each of said coupling pins being mounted such that the bulbous second end of each coupling pin is positioned for a frictional engagement within a corresponding one of the hollow bushings, and an inside diameter of each of the bushings is at least 0.125 inch larger than an outside diameter each bulbous second end of each coupling pin; and wherein the circular power ring is axially free floating with respect to each circular hub.

The invention also provides a coupling for attaching a pair of longitudinally aligned, rotatable shafts comprising:

a) a pair of circular hubs each circular hub having an inner flat surface and an outer surface, each circular hub having a bore through a central axis thereof; an attachment fixing one of the rotatable shafts within each bore; a plurality of circular apertures through and substantially equally spaced around each circular hub; a plurality of hollow bushings positioned such that one hollow bushing is positioned in each circular aperture; said hollow bushings comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder; wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh.

b) a circular power ring positioned between the inner flat surface of each circular hub; said circular power ring having front and rear flat surfaces; a plurality of coupling pins, said coupling pins having a first end and a second end, said first ends being fixed to and extending outwardly from each of the front and rear surfaces of said circular power ring, each of said coupling pins being mounted such that the second end of each coupling pin is positioned for a frictional engagement within a corresponding one of the hollow bushings, and wherein the circular power ring is axially free floating with respect to each circular hub.

The invention still further provides a coupling for attaching a pair of longitudinally aligned, rotatable shafts comprising:

a) a pair of circular hubs each circular hub having an inner flat surface and an outer surface, each circular hub having a bore through a central axis thereof; an attachment fixing one of the rotatable shafts within each bore; a plurality of coupling pins, said coupling pins having a first end and a second end, said first ends being fixed to and extending outwardly from each of the front and rear surfaces of said circular power ring, b) a circular power ring positioned between the inner flat surface of each circular hub; said circular power ring having front and rear flat surfaces; a plurality of circular apertures through and substantially equally spaced around each front and rear flat surfaces; a plurality of hollow bushings positioned such that one hollow bushing is positioned in each circular aperture; said hollow bushings comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder; wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh; each of said coupling pins being mounted such that the second end of each coupling pin is positioned for a frictional engagement within a corresponding one of the hollow bushings, and wherein the circular power ring is axially free floating with respect to each circular hub.

The invention additionally provides a hollow bushing comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder; wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh.

DETAILED DESCRIPTION OF THE PREFERRED EMBODIMENT

Figure 1:
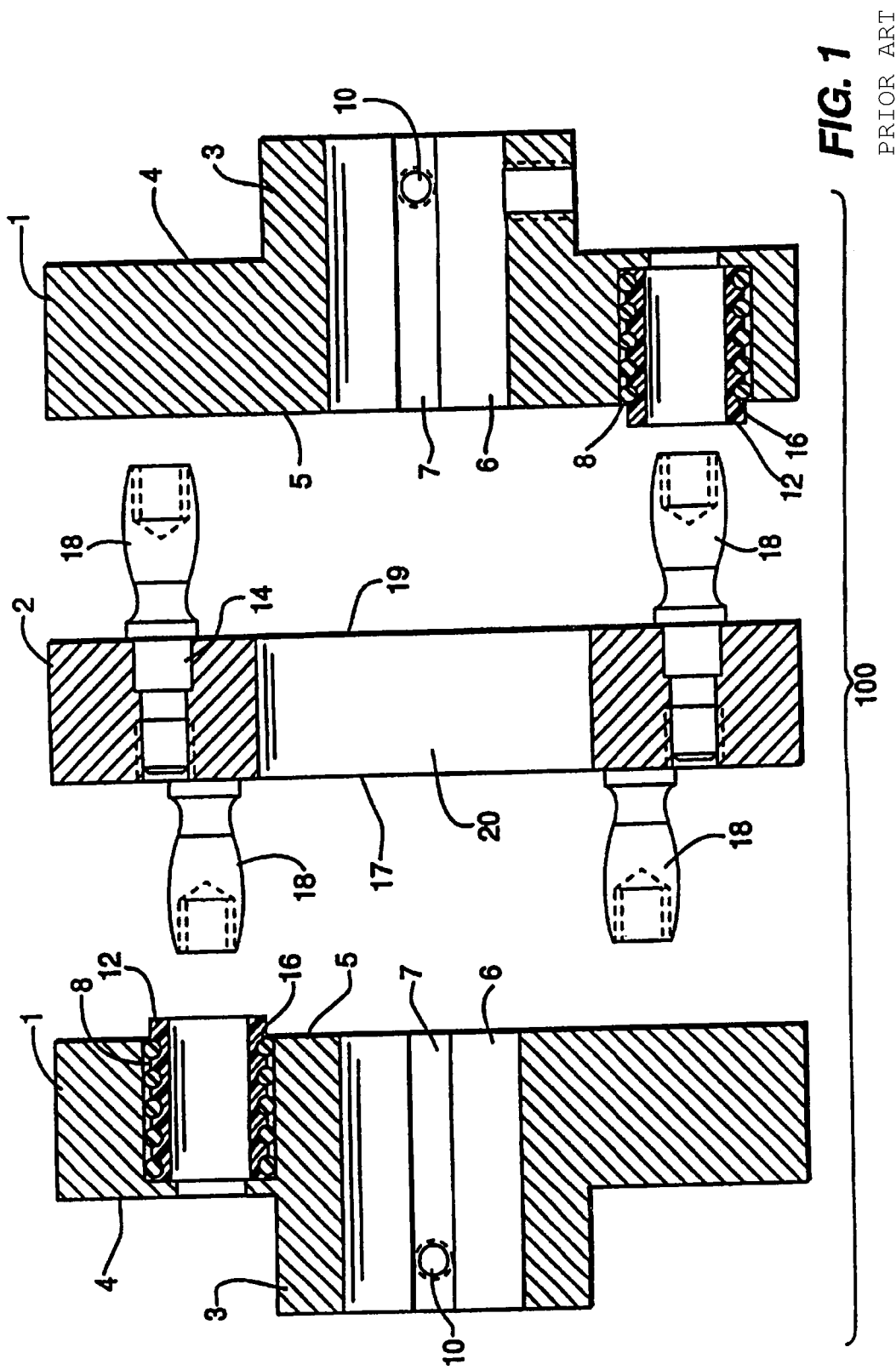
FIG. 1 shows a sectional side-view of a coupling embodiment according to the invention.

The invention provides a coupling with a free-floating center piece for joining and self-aligning rotatable shafts. Referring to FIG. 1, a coupling is shown which has first and second circular hubs 1, and a circular power ring 2 positioned between the circular hubs. Each circular hub 1 has an inner flat surface 5 and an outer surface 4. Each hub also has a bore 6 through the hub's central axis. The bore extends entirely through the hub 1. The bore 6 has an attachment 7 for fixing a circular shaft (not shown) within each hub bore 6. Each shaft terminates substantially flush with the inner flat surface 5 of each hub. The attachment 7 may comprise a keyway, bolt, screw, or the like through each hub for engaging a complementary key on the shaft. Each shaft is fixed within each keyway, for example, by means of a key for allowing various center circle diameters, and screw 10. The outer surface 4 of each hub may contain a shaft supporting sleeve 3 which is concentric with bore 6, and which projects out from the outer surface 4 of each hub.

Figure 2:
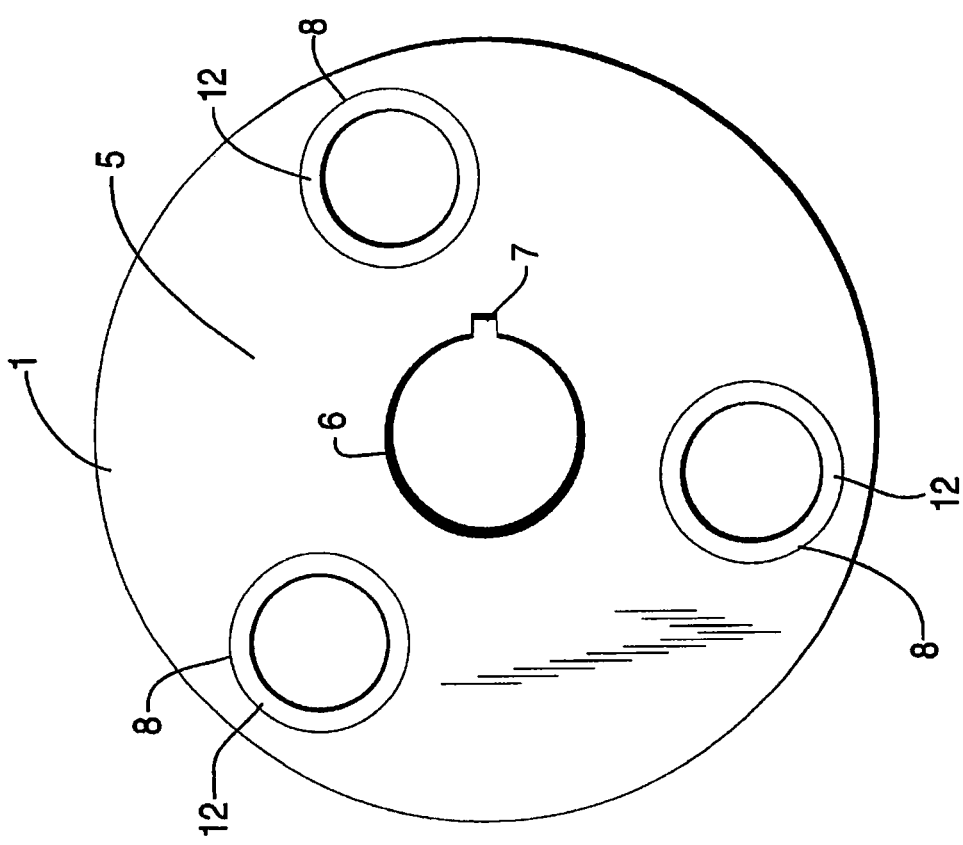
FIG. 2 shows a view of a circular hub embodiment of the invention.

As shown in FIG. 2, each hub 1 has a plurality of circular apertures 8 through the hub 1 which are preferably equally spaced around the bore 6. Although each hub is shown with three apertures, it may contain from about two to about twelve or more circular apertures 8. The apertures are preferably equally spaced around each hub and have centers equidistant from a central axis of the bore 6 as shown. However, there may also be two or more arrays rows of apertures having centers at equal radii per row from the center of the bore.

Each circular aperture 8 has an annular hollow bushing 12, shown in FIG. 1, which may protrude slightly from the inner flat surface 5 of each hub by from about 1/32 inch to about 3/32 inch to thereby buffer any contact between the hubs 1 and the power ring 2. The bushings 12 preferably have a grooved outer surface which contain a plurality of spaced o-rings 16 in the grooves of each bushing. The o-rings are set between each bushing and an inner aperture wall and provide a cushioning effect to the torque drive from the shafts. The o-rings are preferably coated with a suitable lubricant such as lithium or silicone grease.

Figure 5:
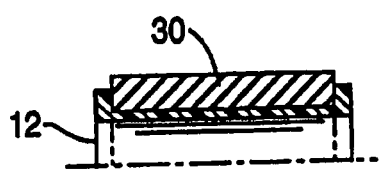
FIG. 5 shows a schematic representation of a flat rubber sleeve for use with a bushing of the present invention
Figure 6:
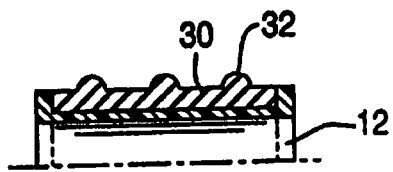
FIG. 6 shows a schematic representation of a rubber sleeve having ridges for use with a bushing of the present invention.

Alternatively, as shown in FIGS. 5 and 6, a cylindrical rubber sleeve 30 may be provided between each bushing 12 and each circular aperture wall. The rubber sleeve 30 may be flat as shown in FIG. 5 or may contain ridges 32, as shown in FIG. 6, to thereby substitute for the o-rings. The bushings 12 are preferably composed of an elastomeric material such as rubber, polyamide or reinforced epoxy material. The bushing material should have a low coefficient of friction and be capable of resisting dimensional deformation at temperatures of up to about 400° F. A preferred bushing material is a reinforced epoxy material, which is commercially available from various manufacturers. The o-rings or rubber sleeve is preferably composed of a fluoroelastomer material such as DuPont Viton or a #70 durometer rubber.

Figure 3:
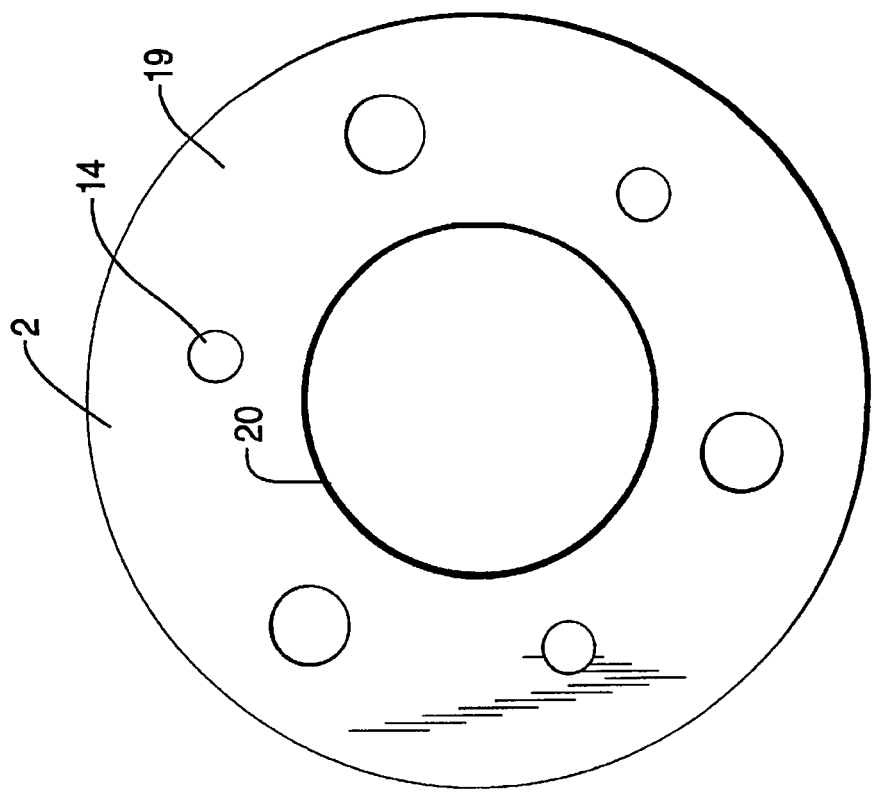
FIG. 3 shows a view of a circular power ring embodiment of the invention.
Figure 4:
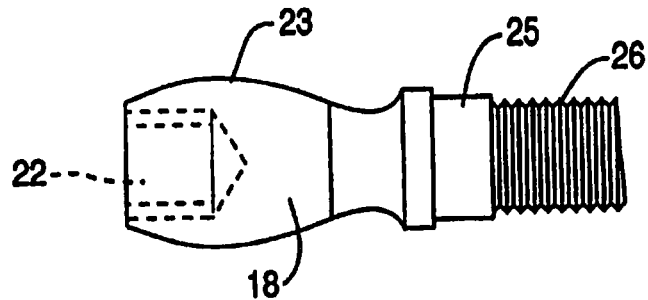
FIG. 4 shows a side-view of a coupling pin embodiment.

The circular power ring 2 has a front flat surface 17, a rear flat surface 19, and a central bore 20 through the power ring's central axis. The circular power ring 2 may have a diameter less than the diameter of each circular hub 1. As seen in FIG. 3, the power ring 2 also contains a plurality of circular apertures 14, preferably from about two to about twelve, having inner threads which engage with complementary threads on coupling pins 18. Referring to FIG. 4, the coupling pins 18 each have a round head 23, preferably barrel shaped, and a screw end 25. Each round head 23 has a recessed fitting 22 for engaging an Allen wrench. The screw ends 25 of the pins 18 have outer threads 26 which engage with the inner threads of the apertures 14 in the power ring 2.

There are preferably from about two to about twelve or more coupling pins extending outwardly from each of the front flat surface 17 and the rear flat surface 19 of the power ring 2. It is preferred that each of the front flat surface 17 and the rear flat surface 19 of the power ring have the same number of pins. The pins 18 on both the front flat surface 17 and the rear flat surface 19 are preferably arranged symmetrically balanced around the central bore 20. The round heads 23 of the coupling pins are shaped to engage with the hollow bushings 12 inside the circular apertures 8 of the circular hubs 1. Most preferably, each hub 1 contains about three apertures 8, and the power ring 2 has about three coupling pins 18 extending outwardly from each of the front flat surface 17 and rear flat surface 19.

In a preferred embodiment of the invention, shown in FIG. 1, a free-floating coupling device is assembled by engaging coupling pins 18 on a front flat surface 17 of a circular power ring 2 with hollow bushings 12 located inside circular apertures 8 of a first circular hub 1. Likewise, coupling pins 18 on a rear flat surface 19 of the circular power ring are engaged with hollow bushings 12 located inside circular apertures 8 of a second circular hub 1.

Figure 10:
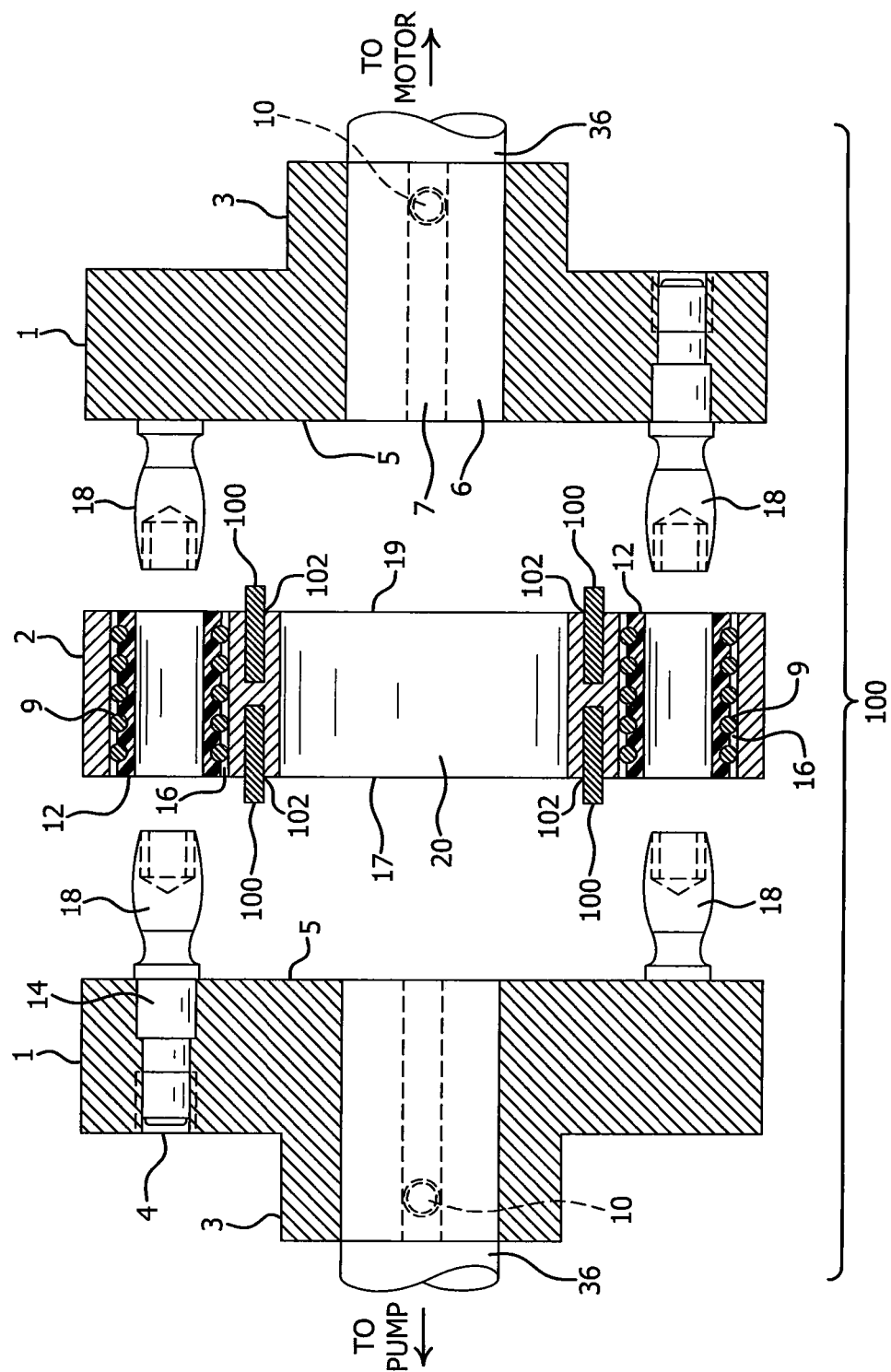
FIG. 10 shows a side view of an alternative coupling of the invention.
Figure 11:
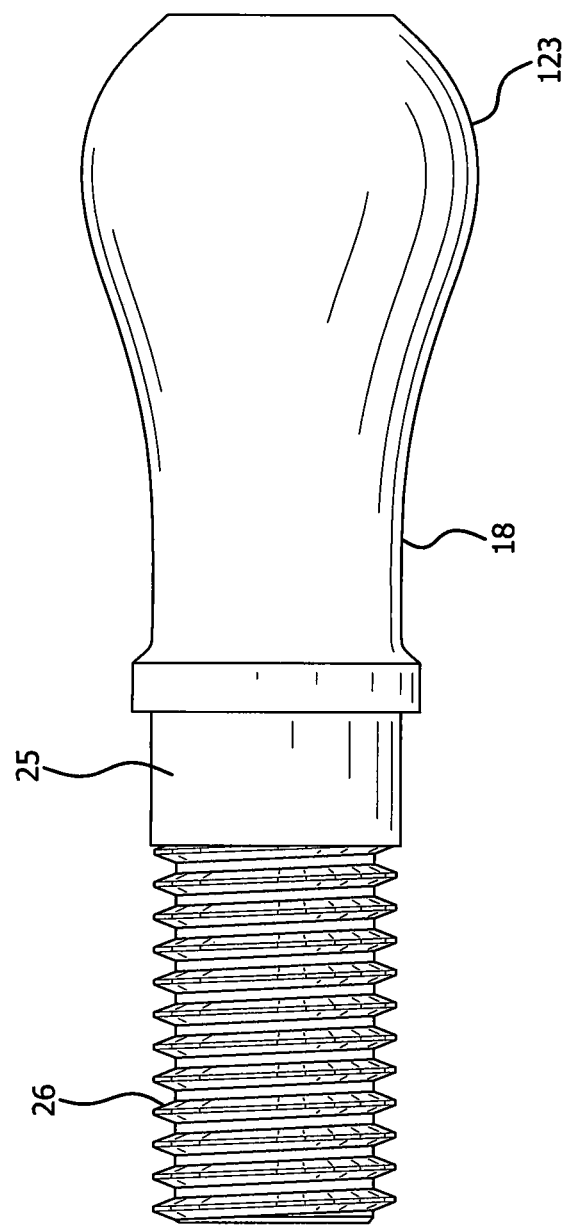
FIG. 11 shows an embodiment, wherein the coupling pins each have a bulbous head.

In an alternative embodiment of the invention, the pins 18 are positioned to extend inwardly from the hubs 1 and engage bushings 12 in apertures through the power ring 2. As shown in FIG. 10, a free-floating coupling device is assembled by engaging coupling pins 18 on an inner flat surface 5 of a first circular hub 1 with hollow bushings 12 located inside circular apertures 14 on a front flat surface 17 of a circular power ring 2. Likewise, coupling pins 18 on an inner flat surface 5 of a second circular hub 1 are engaged with hollow bushings 12 located inside circular apertures 14 on a rear flat surface 19 of the circular power ring. As shown, a shaft 36 is positioned within the bore of each hub 1. As an example, one of the shafts may connect to a driver such as a motor, for example a 5 h.p. to 1,000 h.p. motor or larger, and the other shaft may connect to driven equipment such as a pump, for example a pump in a chemical process or water transmitting facility, or other suitable mechanical device. The driver may be an electric motor, steam or gas turbine, internal combustion engine. The driven equipment may also be a compressor, gear box, fan, paper making machine, shredder, steel mill machine, etc.

Figure 7:
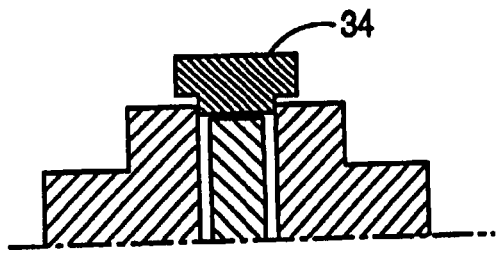
FIG. 7 shows a schematic representation of a spacing template for aligning the hubs and power ring.

In order to achieve proper shaft rotation, it is important that the hubs have appropriate clearance from the power ring such that the power ring is free to move between the two hubs. Such may be accomplished by use of a spacing template 34 as shown in FIG. 7. The spacing template is used to properly align the power ring 2 and the hubs 1 during assembly of the coupling of the invention. Such may comprises a notched block composed of any suitable material.

Figure 8:
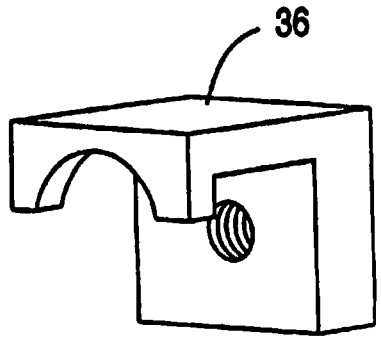
FIG. 8 shows a perspective view of a bushing extractor useful for extracting a bushing from the hub.
Figure 9:
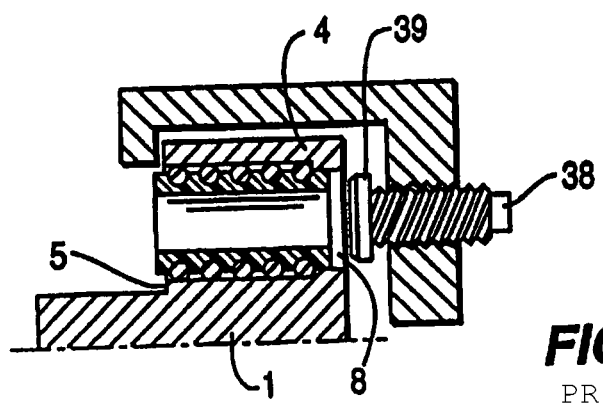
FIG. 9 shows a side sectional view of bushing extractor useful for extracting a bushing from the hub.

In the practice of the invention, it is foreseen that the bushings 18, o-rings 16 and/or rubber sleeves 30, 32 may periodically wear out and must be replaced. Worn out bushings may be removed by employing a bushing extractor 36, shown in FIG. 8. Referring to FIG. 9, the bushing extractor 36 is engaged with a hub 1 so that a screw 38 through the bushing extractor 36 is aligned with a circular aperture 8 on the outer surface 4 of the hub 1. The screw 38 is then rotated so that a flat screw surface 39 pushes the bushing 12 through the circular aperture 8 from the hub's outer surface 4 and out through the same circular aperture on the hub's inner flat surface 5.

The circular hubs, the circular power ring, and the coupling pins may be made of any suitable material, the most preferred being stainless steel. The hubs and power ring may have any suitable diameter, for example from about 2 inches or less to about two feet in diameter or more.

In the practice of the invention, a shaft 36 is connected to a motor or a pump, or the like. As the shafts rotate, they cause rotation of the coupling of the present invention. During rotation, longitudinal alignment of the shafts may become distorted or misaligned. However, because the circular power ring is free floating with respect to each hub, the coupling of the invention allows for a great degree of tolerable flexibility between the hubs and the power ring. If the shafts become misaligned, the bushings transmit rotational force along the sides of the pins. The power ring then corrects for misalignment.

The power ring and hubs re-align distortion between the two shafts. Since the coupling does not transmit any significant radial force to the rotating shafts it will increase the life of the coupling. Another advantage of the coupling of the invention is that the same size pins and bushings can be used with any size hubs or power rings. It is also within the contemplation of the instant invention that several coupling devices according to the invention may be connected in series.

Figure 12:
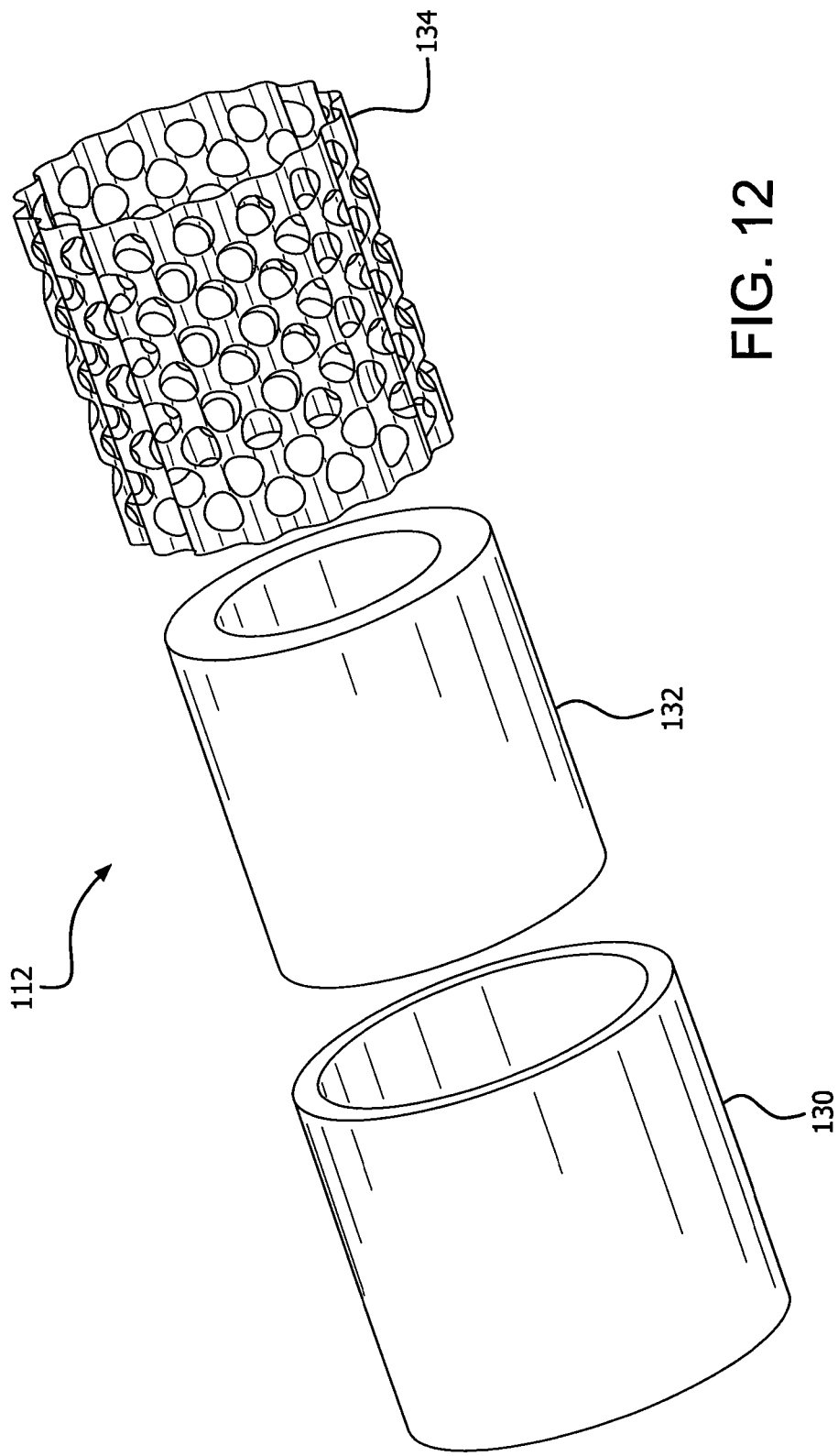
FIG. 12 shows an improved hollow bushing according to the invention.

While FIGS. 1, 4 and 10 show coupling pins having a barrel shaped design, FIG. 12 shows an improved embodiment, wherein the coupling pins 18 each have a bulbous head 123, and a screw end 25. Each bulbous head 123 has a similar recessed fitting, not shown, for engaging an Allen wrench. The screw ends 25 of the pins 18 have outer threads 26 which engage with the inner threads of the apertures 14 in the power ring 2 or circular hub 1. The bulbous head 123 of said coupling pins having a generally truncated spherical, bulbous configuration having an outside diameter about 5% to about 25% greater than an outside diameter of the threaded end. The head of the pin is preferably a hard chrome and polished to a mirror finish. The chrome layer is about 0.002". This bulbous head pin design 123 allows use in applications where the angular misalignment is greater than the 3 degrees maximum design tolerance of the barrel head pin 23.

The embodiment shown in FIG. 10 may optionally employ an elastomeric spacer 100 which fits into channels 102 which are around at least one of the mating surfaces of circular hubs 1, and a circular power ring 2. The spacer 102 may project outwardly from circular power ring 2 towards circular hubs 1 as shown in FIG. 10, or may be placed to extend outwardly from circular hubs 1 toward power ring 2, or both. These spacers serve to cushion vibrations and maintain a minimum distance between surfaces of circular hubs 1 and circular power ring 2. The spacers also cushion the axial movement of the floating ring. The spacers are elastically deformable, solid or tubular, and are preferably cylindrical. Spacers may suitably be composed of 95 Durometer rubber, which is a hydrogenated nitrile rubber or they may be a springy, tubular polyurethane. Any desired number of spacers may be conveniently placed between the coupling pins. Such may be placed symmetrically or staggered between the coupling pin around the circular hubs 1, and circular power ring 2. Such spacers may likewise be employed in the embodiment of FIG. 1.

FIG. 12 shows an improved hollow bushing according to the invention. The hollow bushing 112 comprises an elastically deformable outer cylinder 130, an elastically deformable inner cylinder 132 positioned within the elastically deformable outer cylinder, and a cylindrical, radially compressible spring sleeve 134 preferably having a corrugated, perforated surface. The sleeve is fixed between the elastically deformable outer cylinder and the elastically deformable inner cylinder. The elastically deformable outer cylinder comprises a first rubbery material such as a neoprene. The outer cylinder material should have a low coefficient of friction and be capable of resisting dimensional deformation at temperatures of up to about 400° F. A preferred outer cylinder material is Viton, which is commercially available from DuPont. It preferably has a Shore hardness ranging from about 40 to about 60. The elastically deformable inner cylinder comprises a different second rubbery material, wherein the second rubbery material has a Shore hardness greater than the Shore hardness of the first rubbery material. A preferred inner cylinder material is an oxylated neoprene, which is commercially available from various manufacturers. It preferably has a Shore hardness ranging from about 90 to about 95. The spring sleeve 134 comprises a porous tubular metal mesh material which may be corrugated, and may have a spring constant of from about 20 psi to about 200 psi. The corrugated porous tubular mesh material may be placed between the elastically deformable inner cylinder and the elastically deformable outer cylinder by any convenient mechanical means or by a molding process. A preferred spring sleeve material is spring steel. Other spring sleeve materials include 316 stainless steel. The pins having bulbous head 123 and multilayered bushing allow use in applications where torsional vibration is an issue, such as reciprocating machinery and/or machinery driven by variable frequency drives.

Figure 13:
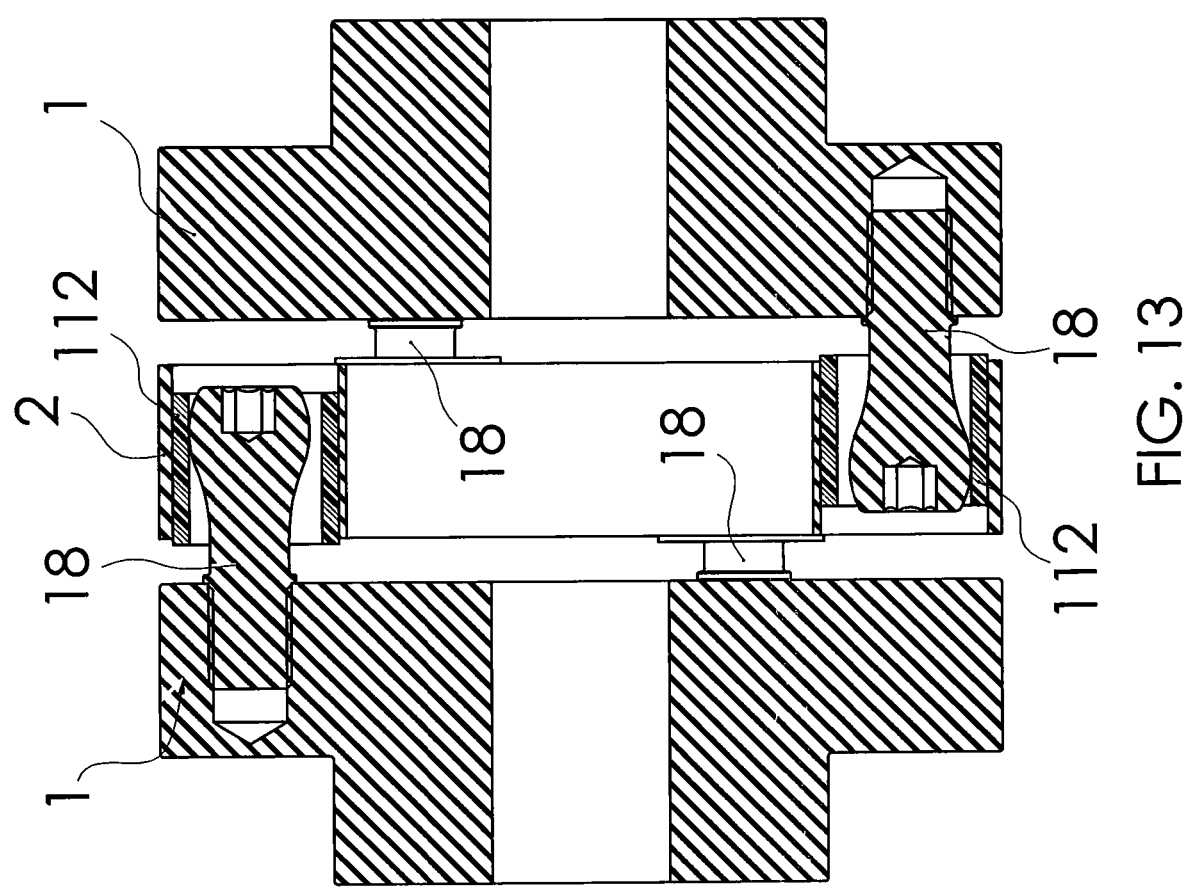
FIG. 13 shows a side cross-sectional view of hubs on opposite sides of a central power rings together with coupling pins each having a bulbous head.
Figure 14:
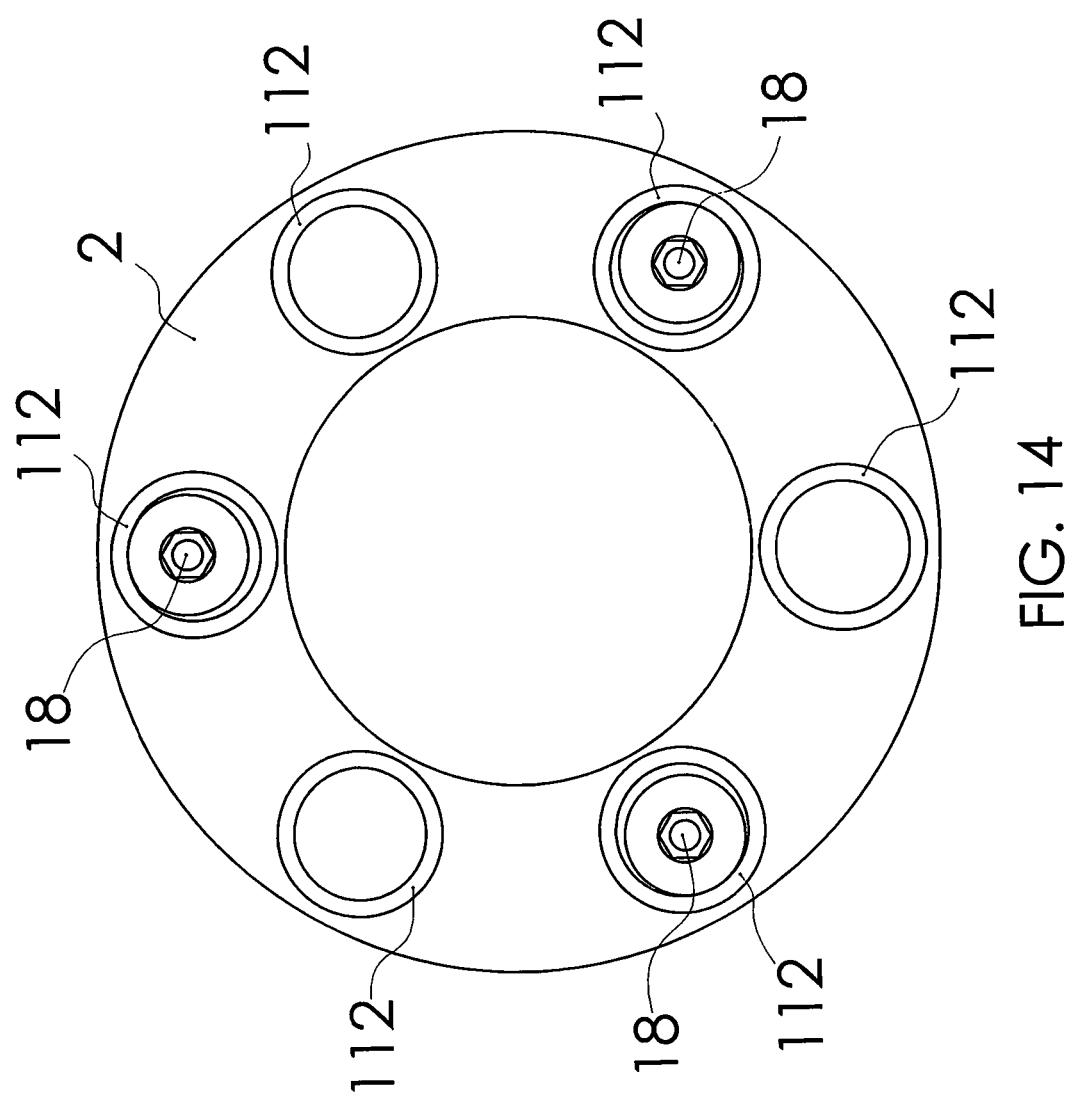
FIG. 14 shows a side view of a circular power ring of the invention including inserted hollow bushings and pins according to the invention.
Figure 15:
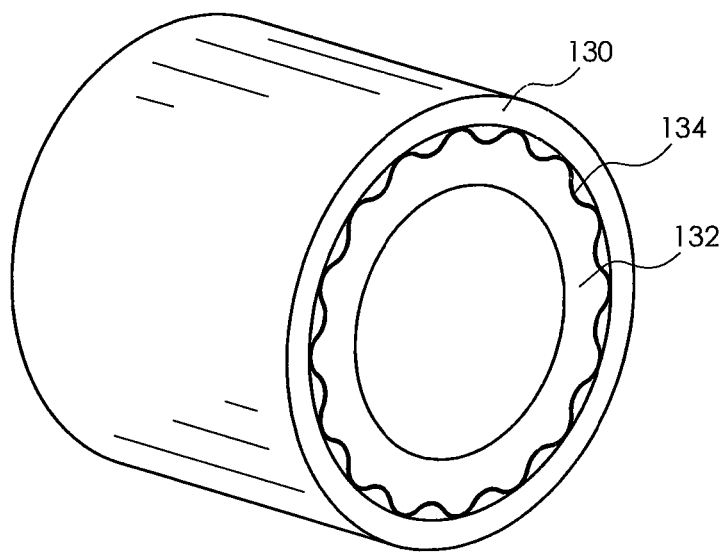
FIG. 15 shows a perspective view of an assembled bushing according to the invention.
Figure 16:
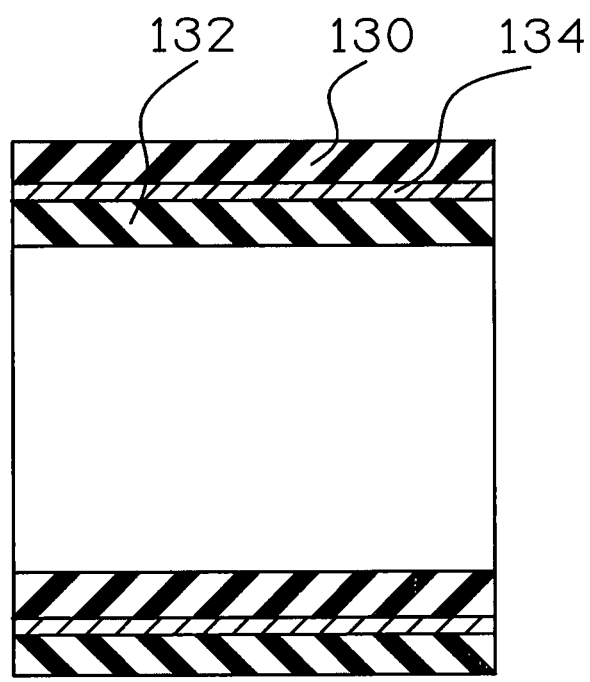
FIG. 16 shows a cross sectional view of an assembled bushing according to the invention.

As shown in FIG. 13 and FIG. 14, both Beth the pins and the bushings are preferably positioned and equally spaced on a circle on the power ring or hub. The diameter of the pin circle is greater than the diameter of the bushing circle by approximately 0.125". It is preferred that in order for the invention to function advantageously, that is, without rotational backlash between the driver and the driven shafts, the difference between the inside diameter of the bushings and the outside diameter of the pins, should match the difference between the diameter of the pin circle and the diameter of the bushing circle. For example, for a bushing inside diameter (1.625") minus pin outside diameter (1.500")=0.125". Then pin circle diameter (9.980") minus bushing circle diameter (9.855") should be 0.125". The difference in size between the inside diameter of the bushing and the outside diameter of the pin gives room for the pin to adjust during a misalignment. This above arrangement is most suitable when the inside diameter of the bushing is made of a firm material, such as graphite impregnated bronze, SAE 841, or fiber reinforced polymer. FIG. 15 shows a perspective view of an assembled bushing according to the invention. FIG. 16 shows a cross sectional view of an assembled bushing according to the invention.

In another embodiment, a solid SAE 841 bronze as a bushing is rubber coated with neoprene. The rubber cylinder around the bronze cylinder adds resiliency to the coupling and reduces torsional vibration. The polished inside diameter of the bronze bushing engages frictionally with the outside diameter of the chrome plated pin at a very low coefficient of friction. The arrangement by which the inside diameter of the bushings is larger that the outside diameter of the pins and by which the diameter of the pin circle is larger that the diameter of the bushing circle. In this case, the coupling could be used in applications where the angular misalignment is as much as 8 angular degrees.

While the invention has been shown and described with reference to a preferred embodiment, it is not to be considered limited thereby, but only construed in accordance with the following claims.

What is claimed is:

1. A hollow bushing comprising
an elastically deformable outer cylinder,
an elastically deformable inner cylinder positioned within the elastically deformable outer cylinder, and
a cylindrical, radially compressible spring sleeve having a corrugated, perforated surface, said sleeve being fixed between the elastically deformable outer cylinder and the elastically deformable inner cylinder; wherein
the elastically deformable outer cylinder comprises a first rubbery material, and the elastically deformable inner cylinder comprises a different second rubbery material, wherein
the second rubbery material has a Shore hardness greater than the Shore hardness of the first rubbery material, and
the spring sleeve comprises a porous metal mesh.

2. A coupling for attaching a pair of longitudinally aligned, rotatable shafts comprising:
a) a pair of circular hubs, each circular hub having an inner flat surface and an outer surface, each circular hub having a bore through a central axis thereof;
an attachment fixing one of the rotatable shafts within each bore;
a plurality of circular apertures through and substantially equally spaced around each circular hub;
a plurality of hollow bushings positioned such that one hollow bushing is positioned in each circular aperture;
said hollow bushings comprising an elastically deformable outer cylinder,
an elastically deformable inner cylinder positioned within the elastically deformable outer cylinder, and
a cylindrical, radially compressible spring sleeve having a corrugated, perforated surface, said sleeve being fixed between the elastically deformable outer cylinder and the elastically deformable inner cylinder;
b) a circular power ring positioned between the inner flat surface of each circular hub;
said circular power ring having front and rear flat surfaces;
a plurality of coupling pins, said coupling pins having a first end and a second end, said first end being fixed to and extending outwardly from each of the front and rear surfaces of said circular power ring, and the second end of said coupling pins having a generally truncated spherical, bulbous configuration such that the second end has an outside diameter about 5% to about 25% greater than an outside diameter of the first end; each of said coupling pins being mounted such that the bulbous second end of each coupling pin is positioned for a frictional engagement within a corresponding one of the hollow bushings, and an inside diameter of each of the bushings is at least 0.125 inch larger than an outside diameter each bulbous second end of each coupling pin; and wherein
the circular power ring is axially free floating with respect to each circular hub.

3. The coupling of claim 2 wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh.

4. The coupling of claim 2 further comprising a plurality of elastically deformable, solid cylindrical spacers attached to at least one of each circular hub and the circular power ring, and projecting between each circular hub and the circular power ring, and the spacers being positioned around at least one of each circular hub and circular power ring between the coupling pins.

5. An assembly comprising the coupling of claim 2 and a shaft fixed within the bore of each hub.

6. The assembly of claim 5 further comprising a motor attached to one of the shafts.

7. The assembly of claim 5 further comprising a motor attached to one of the shafts and a pump attached to another shaft.

8. A coupling for attaching a pair of longitudinally aligned, rotatable shafts comprising:
a) a pair of circular hubs each circular hub having an inner flat surface and an outer surface, each circular hub having a bore through a central axis thereof;
an attachment fixing one of the rotatable shafts within each bore;
a plurality of coupling pins, said coupling pins having a first end and a second end, said first end being fixed to and extending outwardly from each of the inner flat surfaces of said circular hubs, and the second end of said coupling pins having a generally truncated spherical, bulbous configuration such that the second end has an outside diameter about 5% to about 25% greater than an outside diameter of the first end;
b) a circular power ring positioned between the inner flat surface of each circular hub;
said circular power ring having front and rear flat surfaces;
a plurality of circular apertures through and substantially equally spaced around the front and rear flat surfaces of the power ring;
a plurality of hollow bushings positioned such that one hollow bushing is positioned in each circular aperture;
said hollow bushings comprising an elastically deformable outer cylinder,
an elastically deformable inner cylinder positioned within the elastically deformable outer cylinder, and a cylindrical, radially compressible spring sleeve having a corrugated, perforated surface,
said sleeve being fixed between the elastically deformable outer cylinder and the elastically deformable inner cylinder;
each of said coupling pins being mounted such that the bulbous second end of each coupling pin is positioned for a frictional engagement within a corresponding one of the hollow bushings, and an inside diameter of each of the bushings is at least 0.125 inch larger than an outside diameter each bulbous second end of each coupling pin; and wherein the circular power ring is axially free floating with respect to each circular hub.

9. The coupling of claim 8 wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh.

10. The coupling of claim 8 further comprising a plurality of elastically deformable, solid cylindrical spacers attached to at least one of each circular hub and the circular power ring, and projecting between each circular hub and the circular power ring, and the spacers being positioned around at least one of each circular hub and circular power ring between the coupling pins.

11. An assembly comprising the coupling of claim 8 and a shaft fixed within the bore of each hub.

12. The assembly of claim 11 further comprising a motor attached to one of the shafts.

13. The assembly of claim 11 further comprising a motor attached to one of the shafts and a pump attached to another shaft.

14. A coupling for attaching a pair of longitudinally aligned, rotatable shafts comprising:
  a) a pair of circular hubs each circular hub having an inner flat surface and an outer surface, each circular hub having a bore through a central axis thereof;
  an attachment fixing one of the rotatable shafts within each bore; a plurality of circular apertures through and substantially equally spaced around each circular hub;
  a plurality of hollow bushings positioned such that one hollow bushing is positioned in each circular aperture;
  said hollow bushings comprising an elastically deformable outer cylinder, an elastically deformable inner cylinder positioned within the elastically deformable outer cylinder, and
  a cylindrical, radially compressible spring sleeve having a corrugated, perforated surface, said sleeve being fixed between the elastically deformable outer cylinder and the elastically deformable inner cylinder;
  wherein the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh,
  b) a circular power ring positioned between the inner flat surface of each circular hub;
  said circular power ring having front and rear flat surfaces;
  a plurality of coupling pins, said coupling pins having a first end and a second end, said first ends being fixed to and extending outwardly from each of the front and rear surfaces of said circular power ring, each of said coupling pins being mounted such that the second end of each coupling pin is positioned for a frictional engagement within a corresponding one of the hollow bushings, and wherein
  the circular power ring is axially free floating with respect to each circular hub.

15. The coupling of claim 14 further comprising a plurality of elastically deformable, solid cylindrical spacers attached to at least one of each circular hub and the circular power ring, and projecting between each circular hub and the circular power ring, and the spacers being positioned around at least one of each circular hub and circular power ring between the coupling pins.

16. An assembly comprising the coupling of claim 14 and a shaft fixed within the bore of each hub.

17. The assembly of claim 16 further comprising a motor attached to one of the shafts.

18. The assembly of claim 16 further comprising a motor attached to one of the shafts and a pump attached to another shaft.

19. A coupling for attaching a pair of longitudinally aligned, rotatable shafts comprising:
  a) a pair of circular hubs each circular hub having an inner flat surface and an outer surface, each circular hub having a bore through a central axis thereof;
  an attachment fixing one of the rotatable shafts within each bore;
  a plurality of coupling pins, said coupling pins having a first end and a second end, said first ends being fixed to and extending outwardly from each of the front and rear surfaces of said circular power ring,
  b) a circular power ring positioned between the inner flat surface of each circular hub;
  said circular power ring having front and rear flat surfaces;
  a plurality of circular apertures through and substantially equally spaced around each front and rear flat surfaces;
  a plurality of hollow bushings positioned such that one hollow bushing is positioned in each circular aperture;
  said hollow bushings comprising an elastically deformable outer cylinder, an elastically deformable inner cylinder positioned within the elastically deformable outer cylinder, and a cylindrical, radially compressible spring sleeve having a corrugated, perforated surface, said sleeve being fixed between the elastically deformable outer cylinder and the elastically deformable inner cylinder; wherein
  the elastically deformable outer cylinder comprises a first rubbery material, and the elastically deformable inner cylinder comprises a different second rubbery material, wherein the second rubbery material has a Shore hardness greater than the Shore hardness of the first rubbery material, and the spring sleeve comprises a porous metal mesh;
  each of said coupling pins being mounted such that the second end of each coupling pin is positioned for a frictional engagement within a corresponding one of the hollow bushings, and wherein
  the circular power ring is axially free floating with respect to each circular hub.

20. The coupling of claim 19 further comprising a plurality of elastically deformable, solid cylindrical spacers attached to at least one of each circular hub and the circular power ring, and projecting between each circular hub and the circular power ring, and the spacers being positioned around at least one of each circular hub and circular power ring between the coupling pins.

21. An assembly comprising the coupling of claim 19 and a shaft fixed within the bore of each hub.

22. The assembly of claim 21 further comprising a motor attached to one of the shafts.

23. The assembly of claim 21 further comprising a motor attached to one of the shafts and a pump attached to another shaft.

* * * * *